US012782852B2

(12) United States Patent
Juri et al.

(10) Patent No.: US 12,782,852 B2
(45) Date of Patent: *Nov. 3, 2026

(54) CLEANING BLADE, CLEANING UNIT, INTERMEDIATE TRANSFER UNIT, AND IMAGE FORMING APPARATUS

(71) Applicants: Keiichiro Juri, Tokyo (JP); Masahiro Ohmori, Kanagawa (JP); Takuya Akiyama, Kanagawa (JP)

(72) Inventors: Keiichiro Juri, Tokyo (JP); Masahiro Ohmori, Kanagawa (JP); Takuya Akiyama, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/037,286

(22) Filed: Jan. 27, 2025

(65) Prior Publication Data

US 2025/0244696 A1 Jul. 31, 2025

(30) Foreign Application Priority Data

Jan. 29, 2024 (JP) ................................ 2024-010722

(51) Int. Cl.
*G03G 15/16* (2006.01)
*C08J 7/04* (2020.01)
(Continued)

(52) U.S. Cl.
CPC .......... *G03G 15/161* (2013.01); *C08J 7/0427* (2020.01); *C09D 127/18* (2013.01);
(Continued)

(58) Field of Classification Search
CPC ... G03G 15/161; C08J 7/0427; C08J 2375/04; C08J 2427/18; C08J 2433/12; C09D 127/18; C09D 133/12
See application file for complete search history.

(56) References Cited

U.S. PATENT DOCUMENTS

2014/0205338 A1 7/2014 Gondoh et al.
2017/0003643 A1 1/2017 Aoyama et al.
(Continued)

FOREIGN PATENT DOCUMENTS

JP H06-348193 A 12/1994
JP H07-306616 A 11/1995
(Continued)

OTHER PUBLICATIONS

U.S. Appl. No. 18/650,335, filed Apr. 30, 2024.
(Continued)

*Primary Examiner* — Joseph S Wong
(74) *Attorney, Agent, or Firm* — XSENSUS LLP

(57) ABSTRACT

A cleaning blade includes an elastic cleaning blade including an edge layer and a coating layer on the front end portion of the elastic cleaning blade substrate, the coating layer that comes into contact with a cleaning target to clean the surface of the cleaning target, the front end portion including a front edge ridge part and a cleaning blade supporting member to support the elastic cleaning blade substrate, wherein the maximum penetration depth hmax of the indenter of a microhardness tester is between 4.0 μm and 10.0 μm at a position 100 μm inward from the front edge ridge part on the undersurface of the elastic cleaning blade substrate as measured according to a nanoindentation hardness test.

20 Claims, 3 Drawing Sheets

(51) Int. Cl.
*C09D 127/18* (2006.01)
*C09D 133/12* (2006.01)

(52) U.S. Cl.
CPC ......... *C09D 133/12* (2013.01); *C08J 2375/04* (2013.01); *C08J 2427/18* (2013.01); *C08J 2433/12* (2013.01)

(56) References Cited

U.S. PATENT DOCUMENTS

| | | | |
|---|---|---|---|
| 2021/0302903 | A1* | 9/2021 | Ise ......................... G03G 21/12 |
| 2022/0221817 | A1 | 7/2022 | Juri et al. |
| 2022/0317601 | A1 | 10/2022 | Aoki et al. |
| 2023/0061068 | A1 | 3/2023 | Goto et al. |
| 2023/0103454 | A1 | 4/2023 | Kikuchi et al. |
| 2023/0236536 | A1 | 7/2023 | Ohmori et al. |
| 2023/0384730 | A1 | 11/2023 | Shimada et al. |
| 2024/0053700 | A1 | 2/2024 | Ohmori et al. |
| 2024/0152085 | A1 | 5/2024 | Juri et al. |
| 2024/0255889 | A1 | 8/2024 | Ohmori et al. |
| 2024/0255890 | A1 | 8/2024 | Goto et al. |

FOREIGN PATENT DOCUMENTS

| | | | |
|---|---|---|---|
| JP | H08-220962 | A | 8/1996 |
| JP | H09-258632 | A | 10/1997 |
| JP | H10-214009 | A | 8/1998 |
| JP | 2000-147972 | A | 5/2000 |
| JP | 2004-101551 | A | 4/2004 |
| JP | 2017-016083 | A | 1/2017 |
| JP | 2023-109394 | A | 8/2023 |
| WO | 2022/172111 | A1 | 8/2022 |

OTHER PUBLICATIONS

U.S. Appl. No. 18/665,918, filed May 16, 2024.
Extended European Search Report issued May 13, 2025 in European Patent Application No. 25154568.7, 10 pages.

* cited by examiner

CLEANING BLADE, CLEANING UNIT, INTERMEDIATE TRANSFER UNIT, AND IMAGE FORMING APPARATUS

CROSS-REFERENCE TO RELATED APPLICATIONS

This patent application is based on and claims priority pursuant to 35 U.S.C. § 119 to Japanese Patent Application No. 2024-010722, filed on Jan. 29, 2024, in the Japan Patent Office, the entire disclosure of which is hereby incorporated by reference herein.

BACKGROUND

Technical Field

The present disclosure is related to a cleaning blade, a cleaning unit, an intermediate transfer unit, and an image forming apparatus.

Description of the Related Art

Seamless belts have been used as components in electrophotographic image forming apparatuses for various applications. In full-color electrophotographic image forming apparatuses, an intermediate transfer belt system has been employed, in which developed images of four colors—yellow, magenta, cyan, and black—are overlaid on the intermediate transfer belt and then collectively transferred onto a recording medium such as paper. As a cleaning device for removing residual toner adhering to the surface of the intermediate transfer belt, cleaning blades including elastic members of substances such as polyurethane rubber and support members are widely used.

SUMMARY

According to embodiments of the present disclosure, a cleaning blade is provided which includes an elastic cleaning blade substrate including an edge layer and a coating layer on the front end portion of the elastic cleaning blade substrate that comes into contact with a cleaning target to remove residual matter on the surface of the cleaning target, the coating layer including a front edge ridge part and a cleaning blade supporting member to support the elastic cleaning blade substrate, wherein the maximum penetration depth hmax of the indenter of a microhardness tester is between 4.0 μm and 10.0 μm at a position 100 μm inward from the front edge ridge part on the undersurface of the elastic cleaning blade substrate as measured according to a nanoindentation hardness test.

As another aspect of embodiments of the present disclosure, a cleaning unit is provided which includes the cleaning blade mentioned above.

As another aspect of embodiments of the present disclosure, an intermediate transfer unit which includes an intermediate transfer bod and the cleaning blade mentioned above.

As another aspect of embodiments of the present disclosure, an image forming apparatus is provided which includes an image bearer, a charging device to charge the surface of the image bearer, an irradiator to irradiate the surface of the image bearer charged to form a latent electrostatic image, a developing device to develop the latent electrostatic image with toner to form a visible image, a transfer device including an intermediate transfer body to transfer the visible image to a recording medium, a fixing device to fix the image transferred to the recording medium, and a cleaning device including the cleaning blade mentioned above to clean the intermediate transfer body.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
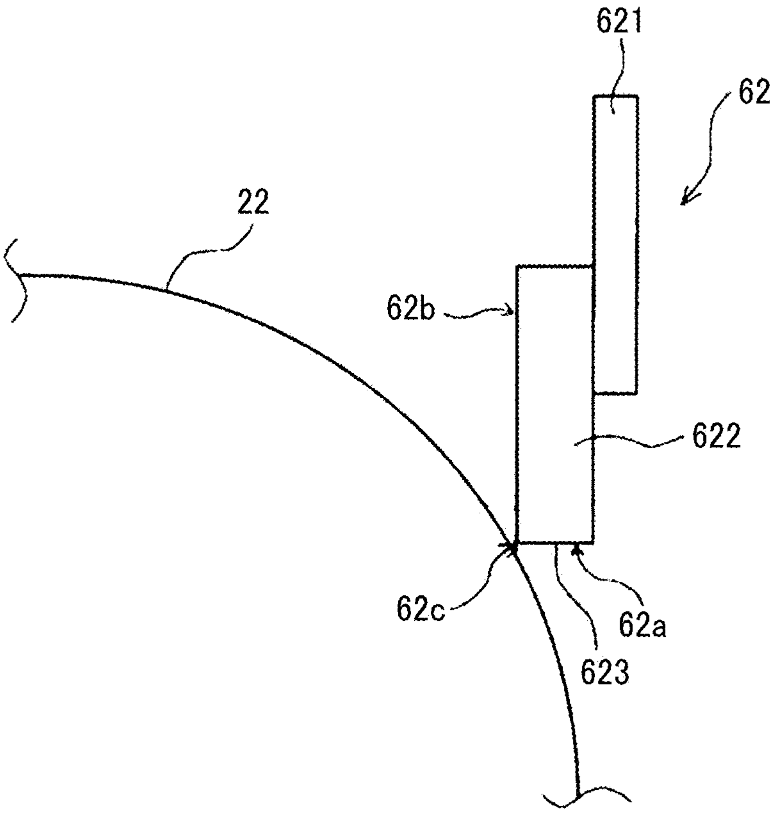
FIG. 1 is a schematic diagram illustrating a cross-sectional view of an example of the cleaning blade of the present disclosure.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

According to the present disclosure, a cleaning blade is provided, which suppresses torque increase even immediately after the start of use of an image forming apparatus and maintains excellent cleaning performance even during continuous printing of high-density images, such as solid images.

The cleaning blade is required to have lubricity in order to prevent an increase in torque, which is the force necessary to rotate the intermediate transfer belt, and to reduce friction with the intermediate transfer belt.

For the cleaning blade, in attempts to mitigate the abrasion between the cleaning blade and the image bearer, for example, cleaning blades coated with lubricants containing fluorinated compounds, such as vinylidene fluoride, have been proposed in Unexamined Japanese Patent Application Publication Nos.2000-147972, 2004-101551, H7-306616 (Japanese Patent No. 3278733), H10-214009, and H6-348193 and used to reduce the abrasion with the image bearer. Furthermore, in an attempt to address the issue of curling or gouging wear at the front edge ridge part of the cleaning blade, a cleaning blade has been proposed in Unexamined Japanese Patent Application Publication No. 2017-016083. This blade includes an elastic member with adequate flexibility and hardness, where the Martens hardness of the surface is set between 1.0 $N/mm^2$ and 15.0 $N/mm^2$, measured at a position 20 μm inward from the front edge ridge part. Additionally, in an attempt to improve the sliding properties of cleaning blades, a cleaning blade coated with a dispersion of PMMA (polymethyl methacrylate) particles in a fluorinated solvent has been proposed in Unexamined Japanese Patent Application Publication No. H8-220962 (Japanese Patent No. 2853598).

In the following description, an example of the present disclosure is explained with reference to FIG. 4. A cleaning blade 62 includes a cleaning blade supporting member 621 and an elastic cleaning blade substrate 622. The elastic cleaning blade substrate 622 includes an edge layer 622*a* and a base layer 622*b*, which possess elasticity, a contact portion 62*c*, and a coating layer 623 that is provided on at least a part of the contact edge, including the contact edge of the contact portion 62*c*.

In the following, the cleaning blade of the present disclosure is described in the case where an intermediate transfer body is to be cleaned (i.e., the cleaning target). Similarly, the "blade substrate of the cleaning blade" may be referred to as the "blade substrate."

Cleaning Blade

One embodiment of the cleaning blade of the present disclosure is a cleaning blade for cleaning an intermediate transfer body and has an edge layer and a coating layer. The maximum penetration depth hmax of an indenter at the blade undersurface of the coating layer provided on the front edge of the edge layer that is brought into contact with the intermediate transfer body is between 4.0 μm and 10.0 μm. The cleaning blade optionally include other members.

The cleaning blade of the present disclosure removes residual matter adhering to the surface of the intermediate transfer body by coming into contact with it.

The residual matter adheres to the surface of the intermediate transfer body. The residual matter is not particularly limited as along as it is to be removed with the cleaning blade. It includes, for example, toner, lubricants, inorganic particles, organic particles, paper dust, debris, dust, or mixtures thereof.

Cleaning devices equipped with a typical cleaning blade raise concerns about the potential stalling of the intermediate transfer body's rotation due to increased torque caused by friction between the cleaning blade and the intermediate transfer body. Moreover, this friction leads to wear at the contact point between the cleaning blade and the intermediate transfer body, which can cause curling (turning up) of the cleaning blade. This curling allows toner to sneak through, ultimately resulting in cleaning defects.

To improve the sliding properties of the cleaning blade and prevent curling (turning up) or an increase in torque, a process known as "touch-up" is widely used. This process involves applying lubricants, such as metal soaps (e.g., zinc stearate) or PMMA (polymethyl methacrylate) particles, to the front edge of the cleaning blade. Typically, during the operation of an image forming apparatus, toner gradually accumulates between the cleaning blade and the image bearer, acting as a lubricant. As a result, the lubricant is required to exhibit its lubricating properties only for the short period before the cleaning blade's behavior stabilizes after the apparatus begins operating. However, typical lubricants containing fine particles often have weak adhesion to the base material, which causes them to detach from the cleaning blade before its behavior stabilizes.

To minimize the detachment of fine particles from the cleaning blade, there is a known technique involving applying a lubricant that contains fine particles and a binding component to fix the particles at the contact part between the intermediate transfer body and the image bearer. The binding component reduces the likelihood of particle detachment, effectively preventing an increase in torque. However, the lubricant often remains on the cleaning blade, making it difficult for the blade's front edge to be fully exposed. This reduces the pressure at the contact point with the intermediate transfer body, worsening cleaning performance. This issue becomes more pronounced when a large amount of toner enters the nipping part between the cleaning blade and the intermediate transfer body, such as during continuous printing of full solid images.

Through extensive research, the inventors of the present invention have found that if the coating layer containing fine particles and a binding component is made brittle and prone to collapse, the coating layer on the front edge of the cleaning blade can wear away more easily while still reducing torque. Such a coating layer exposes the blade front edge early, increasing the pressure at the contact part with the intermediate transfer body. As a result, cleaning performance can be maintained, achieving both torque reduction and effective cleaning, even in situations where large amounts of toner enter the nipping point between the intermediate transfer body and the cleaning blade (e.g., during continuous printing of full solid images).

Accordingly, in the present disclosure, a cleaning blade that cleans an intermediate transfer body is provided, which includes an edge layer and a coating layer. The coating layer, which is provided at the front edge ridge part of the edge layer that contacts the intermediate transfer body, contains fine particles and a binding component. On the undersurface of the blade at the coating layer, the maximum penetration depth hmax of the indenter of a microhardness tester in a nanoindentation hardness test, measured at a position 100 μm inward from the edge ridge portion, is between 4.0 μm and 10.0 μm. As a result, even immediately after the start of use of the image forming apparatus, the rise in torque can be reduced, and a cleaning blade with excellent cleaning performance can be achieved, even in cases where a large amount of toner enters the nip portion with the intermediate transfer body, such as during continuous printing of solid images.

Coating Layer

The coating layer contains fine particles and a binding component that is immiscible with the fine particles and may further optionally include other components. The coating layer is provided on one end of the blade substrate, which serves as the front edge of the cleaning blade on the peripheral side of the blade substrate, as described later. The coating layer may be partially formed on the contact edge where the cleaning blade and intermediate transfer body come into contact. It may also be formed over the entire contact edge or the entire surface of the blade substrate. Among these configurations, it is preferable for the coating layer to be formed over the entire contact edge. Additionally, areas of the blade substrate surface where the coating layer is not present may be referred to as "non-coated areas."

The average thickness of the coating layer on the cleaning blade is preferably between 0.5 μm and 10 μm. If the average thickness is at least 0.5 μm, sufficient sliding properties can be achieved. Conversely, if the average thickness is at most 10 μm, the coating layer becomes brittle and prone to collapse, maintaining cleaning performance. The average thickness of the coating layer can be determined by measuring the thickness (in m) at three or more locations and calculating the average. Measurement locations for the average thickness include the central part of the coating layer, positioned 100 μm inward from the end.

A method of measuring the average thickness of the coating layer involves scraping off a portion of the coating layer using a spatula or cotton swab, followed by shape measurements conducted with a contact surface roughness tester (Surf Test SJ-500, available from Mitutoyo Corporation) or a three-dimensional measuring instrument, such as a laser microscope (LEXT OLS4100, available from Olympus Corporation).

One or more embodiments of the cleaning blade described in the present disclosure are illustrated with reference to the accompanying drawings. The application of the cleaning blade described in the present disclosure is not limited to these embodiments. In the drawings, identical components may be denoted by the same reference numerals (or symbols), and redundant descriptions may be omitted. Additionally, the present disclosure is not restricted to the specific numbers, positions, or shapes of the configurations described below. These parameters may be appropriately selected to suit the implementation of the present disclosure.

Figure 2:
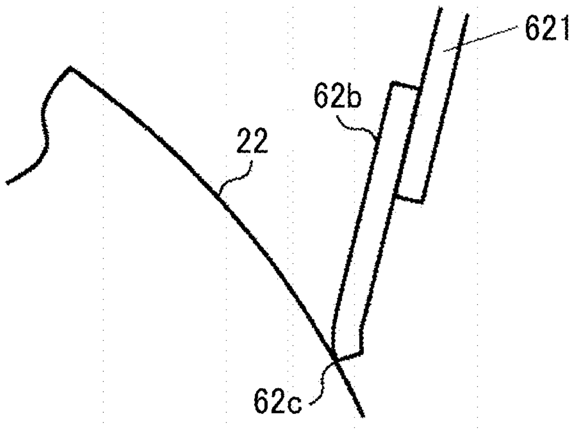
FIG. 2 is a diagram illustrating a state where the cleaning blade of the present disclosure is in contact with the surface of the cleaning target.
Figure 3:
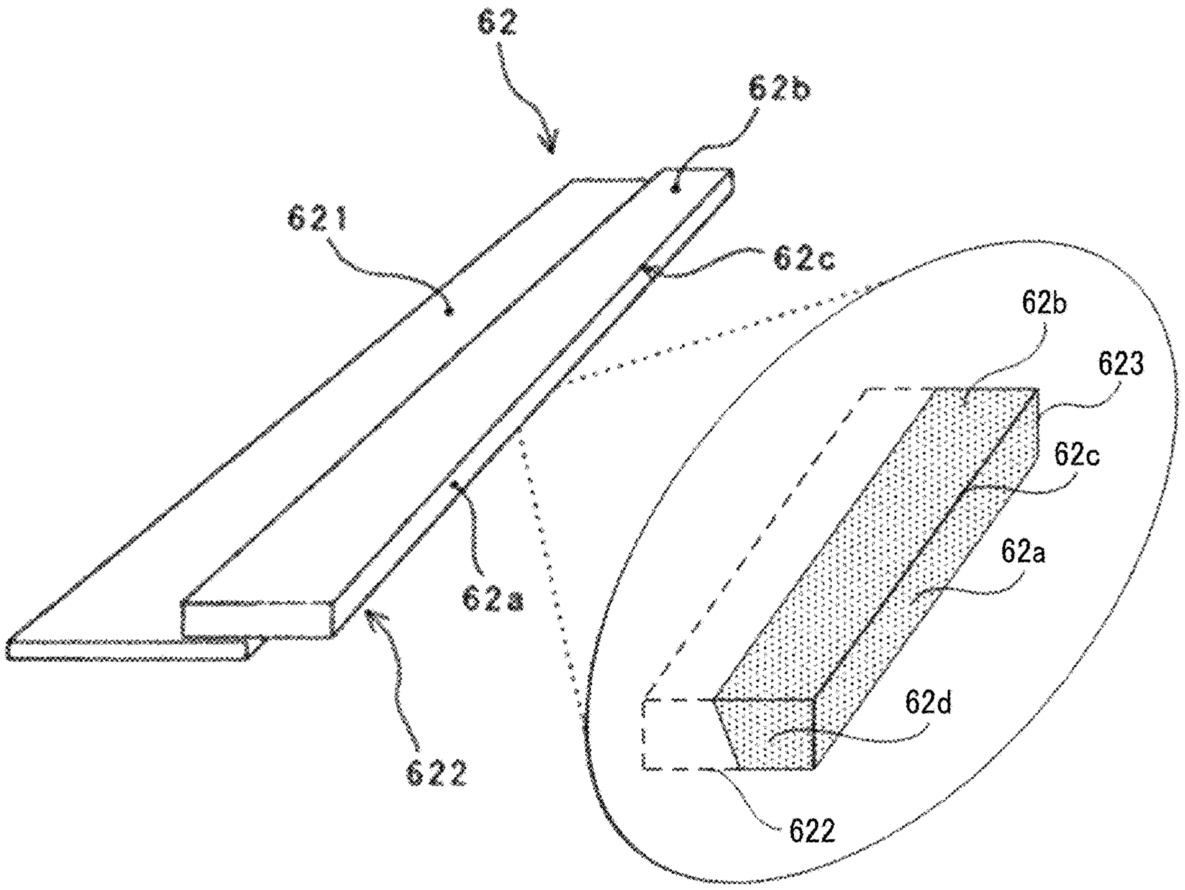
FIG. 3 is a schematic diagram illustrating a perspective view of an example of the cleaning blade of the present disclosure.

FIG. 1 is a schematic cross-sectional diagram illustrating an embodiment of the cleaning blade of the present disclosure, and FIG. 2 is a diagram illustrating the state in which the cleaning blade is in contact with the surface of the intermediate transfer body. FIG. 3 is a diagram illustrating a perspective view and an enlarged view of the vicinity of the contact portion of the cleaning blade illustrated in FIG. 1. The cleaning blade 62 includes a cleaning blade supporting member 621 with a flat shape made of a rigid material such as metal or hard plastic and an elastic cleaning blade substrate 622 with a flat shape. One end of the elastic cleaning blade substrate 622 is connected to the cleaning blade supporting member 621, while the other end forms a free end of predetermined length. The elastic cleaning blade substrate 622 is fixed to one end of the cleaning blade supporting member 621 using an adhesive or similar additives, and the other end of the cleaning blade supporting member 621 is cantilevered to the housing of the cleaning device. The elastic cleaning blade substrate 622 includes a cleaning blade front edge surface **62*a*, a cleaning blade undersurface 62*b*, a contact portion 62*c* of the cleaning blade, which forms one end on the side of the free end of the elastic cleaning blade substrate 622, and a cleaning blade side surface 62*d*. The elastic cleaning blade substrate 622 includes a coating layer 623 formed on at least part of the cleaning blade contact portion 62*c* including its contact edge. The cleaning blade 62 is positioned such that the contact portion 62*c* of cleaning blade runs along its longitudinal direction and remains in contact with the surface of an intermediate transfer belt 22**.

Figure 4:
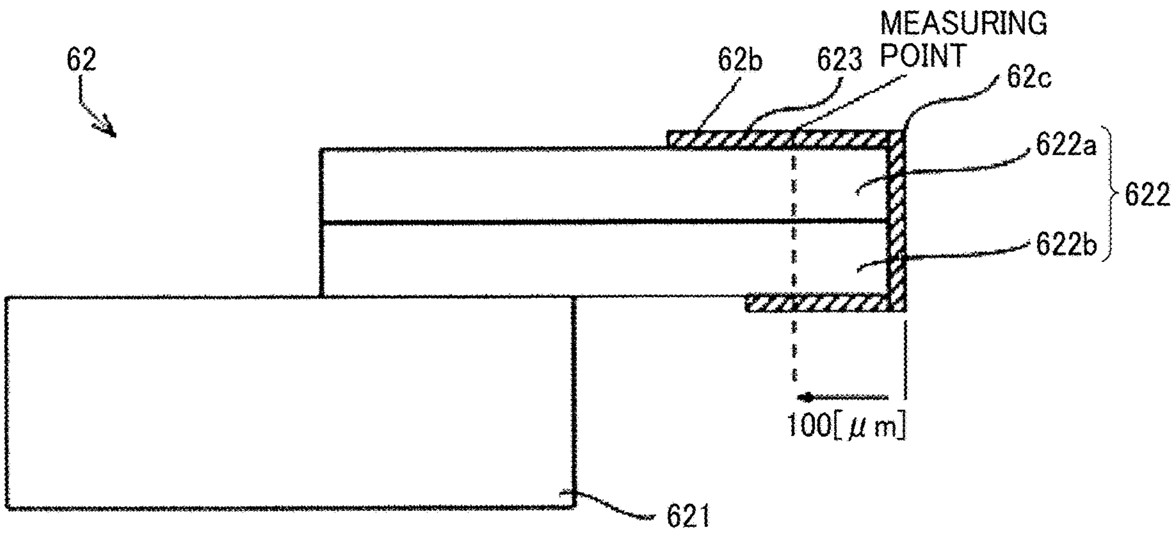
FIG. 4 is a schematic diagram illustrating a cross-sectional view of another example of the cleaning blade of the present disclosure.

FIG. 4 is a schematic cross-sectional view illustrating another embodiment of the cleaning blade of the present disclosure. The cleaning blade 62 includes the cleaning blade supporting member 621 and the elastic cleaning blade substrate 622. The elastic cleaning blade substrate 622 includes an edge layer **622*a* with elasticity, a base layer 622*b*, a contact portion 62*c*, and the coating layer 623 formed on at least part of the contact portion 62*c* including its contact edge. The cleaning blade front edge surface 62*a* and cleaning blade side surface 62*d* are omitted in FIG. 4**.

The coating layer in the present disclosure contains particles and a resin binding component. In one aspect of the present disclosure, it is preferred that the particles serve as domains in the sea-island structure of the coating layer. The type and amount of the particles can be selected according to the type of resin binding component to form the domains.

There are no particular restrictions on the shape of the particles, and it can be suitably selected to suit to a particular application, whether it is regular or irregular. Of these, regular shapes are preferable. If the domain has a regular shape, it is preferably spherical. Such a shaped domain is suitable for preventing issues such as damage to an intermediate transfer body or the blade substrate of the cleaning blade caused by the particles detached from the coating layer.

The volume average particle diameter (50 percent volume diameter, median diameter) of the particles is not particularly limited and can be selected appropriately for the intended purpose. It is preferably between 0.1 μm and 1 μm, more preferably between 0.1 μm and 0.5 μm, and even more preferably between 0.1 μm and 0.3 μm. A volume average particle diameter of the particles of at most 1 μm prevents issues such as unstable dispersion caused by sedimentation of the particles in a solvent. Moreover, a volume a particle diameter of at most 0.5 μm stably disperses the particles in non-aqueous solvents.

There are no specific restrictions on the method of measuring the volume average particle diameter (50 percent volume diameter, median diameter), and it can be suitably selected to suit to a particular application. For example, it can be measured using techniques such as laser diffraction/scattering, dynamic light scattering, or image imaging. Specific methods include a method of applying particles collected from the coating layer of a cleaning blade to a microtrack (available from NIKKISO CO., LTD.) for measurement using laser diffraction/scattering, and a method of directly measuring fine particles on the cleaning blade by counting them with a scanning electron microscope (SEM). It should be noted that the volume average particle diameter of the particles does not significantly change between the particles added to a liquid dispersion to be applied to a cleaning blade and those present in the coating layer.

The content of the particles in the coating layer is not particularly limited and can be selected according to the purpose. To achieve a sliding effect while ensuring that the coating layer becomes brittle and allows easy detachment of the particles due to their higher relative content compared to the binding component, the particle content is preferably between 80 percent by mass and 99 percent by mass of the total mass of the coating layer, more preferably between 90 percent by mass and 98 percent by mass.

Materials for the particles are not specifically restricted and it can be selected according to the purpose. Specific examples involve, but are not limited to, polytetrafluoroethylene (PTFE), tetrafluoroethylene-perfluoropropylene copolymer (FEP), perfluoroalkoxy polymer (PFA), chlorotrifluoroethylene copolymer (CTFE), tetrafluoroethylene-chlorotrifluoroethylene copolymer (TFE/CTFE), ethylene-chlorotrifluoroethylene copolymer (ECTFE), and polychlorotrifluoroethylene (PCTFE). Of these, polytetrafluoroethylene (PTFE) is preferable to enhance the slidability of the cleaning blade.

Polytetrafluoroethylene (PTFE) can be synthesized as needed or procured.

Specific examples of products of PTFE include, but are not limited to, the following brand names: Dion TF Micro Powder TF-9201Z and Dion TF Micro Powder TF-9207Z (both available from 3M Company), Nano FLON 119N and FLUORO E (both available from Shamrock Technologies), TLP10F-1 (available from Mitsui DuPont Fluorochemicals), KTL-500F (available from KITAMURA LIMITED), and Algoflon L203F (available from Solvay S.A.).

In the present disclosure, inclusion of a binding component in the coating layer enhances the adhesion of the particles to the elastic cleaning blade substrate, thereby preventing the detachment of the coating layer. Consequently, it is possible to prevent turning-up and an increase in torque of the cleaning blade. In one aspect of the present disclosure, it is preferable that the binding component serve as the matrix in the sea island structure of the coating layer. In combination with the binding component, the type and amount of the resin should preferably be selected to act as the matrix in the sea island structure.

The binding component is not particularly restricted, and it can be suitably selected to suit to a particular application, provided that it allows for the uniform and stable dispersion of the particles. It includes, for example, vinylidene fluoride (VdF), hexafluoropropylene (HFP), and tetrafluoroethylene (TFE). Among these, copolymers combining these components are preferable and a VdF-HFP-TFE terpolymer is more preferable in terms of lubricity and adhesion to the blade substrate.

Each component in the terpolymer composition of VdF/HFP/TFE is preferably present in the following molar percentages: 30 to 80 mol percent for VdF, 10 to 35 mol percent for HFP, and 5 to 35 mol percent for TFE, to impart flexibility to the blade and the solubility of the binding component in a solvent.

The particles and the binding component are not limited to the examples mentioned above and can be appropriately selected according to the purpose. Examples include, but are not limited to, fine particles of inorganic compounds, acrylic resins, styrene-based resins, and vinyl-based resins. Specific examples of the inorganic compound fine particles include, but are not limited to, silica, alumina, and zirconia. These can be used alone or in combination.

As particles other than the fluororesin, acrylic resins are preferable because they have a certain degree of hardness, thereby providing an expected effect on sliding properties. On the other hand, there are no particular limitations on the shape, and it can be appropriately selected according to the purpose. It is preferably a spherical shape. Such a shape is suitable because it prevents issues including damage to an intermediate transfer body and the blade substrate of the cleaning blade caused by detachment of particles other than the fluororesin from the coating layer.

The coating layer is particularly preferable when it is formed of a combination of PTFE particles and fluroresin or a combination of acrylic particles and polyvinyl alcohol resin or polyvinyl acetal resin.

The volume average particle diameter (50 percent volume diameter, median diameter) of the particles other than the fluororesin is not particularly limited and can be selected appropriately for the intended purpose. It is preferably between 0.1 μm and 1 μm, more preferably at most 0.5 μm, and even more preferably at most 0.3 μm. A volume average particle diameter of the particles of at most 1 μm prevents issues such as unstable dispersion caused by sedimentation of the particles in a solvent. Moreover, a volume a particle diameter of at most 0.5 μm stably disperses the particles in non-aqueous solvents.

There are no particular limitations on the method of producing the coating layer, and it can be appropriately selected according to the purpose. For example, it can be obtained by admixing particles with a mixture of a solvent and a binding component to prepare a particle dispersion and applying the dispersion to the blade substrate of the cleaning blade.

There are no particular limitations on the solvent, and it can be appropriately selected according to the purpose. For example, in the case of fluorine-based particles and binding components, fluorine-containing organic solvents can be used. Examples of fluorine-containing organic solvents include, but are not limited to, hydrofluoroethers (HFE), perfluorocarbons (PFC), and perfluoroethers (PFE). These can be used alone or in combination.

In the present disclosure, the average particle diameter of the particles in the binding component, measured by dynamic light scattering (cumulant analysis based on the intensity distribution), is preferably at most 1 μm, more preferably at most 0.5 μm, and even more preferably at most 0.3 μm, to achieve a uniform dispersion. Even if fine particles with a volume-average particle diameter of at most 1 μm are used, the particles are likely to aggregate to form secondary particles, resulting in a volume-average particle diameter of at least 1 μm. By dispersing these aggregated secondary particles to achieve a particle diameter of at most 1 μm, it is possible to obtain a stable dispersion even if the fluororesin dispersion is stored long-term at low viscosity. There are no particular limitations on the dispersion method, and it can be appropriately selected according to the purpose. Specific examples include, but are not limited to, methods using dispersing machines such as ultrasonic dispersers, three-roll mills, ball mills, bead mills, and jet mills.

There are no particular limitations on the method of forming the coating layer, and it can be appropriately selected according to the purpose. One such example method is dipping, where the blade substrate is either fully or partially immersed in a particle dispersion. In addition to dipping, other coating methods such as spray coating or using a dispenser can also be used.

Blade Substrate

In the present disclosure, the blade substrate of the cleaning blade may also be referred to as the "blade substrate" or "substrate." The shape of the blade substrate should be such that it can remove the residual matter on the intermediate transfer body, and it can be appropriately selected according to the purpose. It is preferable for the contact edge at the contact portion between the blade substrate and the intermediate transfer body to be linear. An example of the blade substrate shape is a plate-like structure.

As for the structure of the blade substrate, there are no specific limitations, and it can be appropriately selected according to the purpose. Examples include single-layer structures, laminated structures, and laminated structures combining multiple members. Of these, single-layer structures and laminated structures combining multiple members are preferable because they are easier to process in forming the cleaning blade. If the blade substrate has a layered (laminate) structure, the layer in contact with the intermediate transfer body may be referred to as the edge layer, and the layer other than the edge layer may be referred to as the base layer. If the blade substrate is a single layer, the blade substrate consists only of the edge layer. It is more preferable that the Martens hardness of the multiple materials in the layered structure differ from one another.

The material of the blade substrate is not particularly limited and can be appropriately selected according to the purpose. In terms of wear prevention of the blade substrate and the removal of residual matter on the intermediate transfer body, it is preferable for the blade substrate to have appropriate elasticity and hardness. Examples of materials for the blade include elastic materials. As for the elastic material, as long as it has high elasticity, there are no particular limitations, and it can be appropriately selected depending on the purpose. Examples include, but are not limited to, polyurethane rubber, silicone rubber, fluororubber, nitrile rubber (NBR), and ethylene-propylene-diene rubber (EPDM). Of these, polyurethane rubber is preferable in terms of durability and non-contamination.

The blade substrate may take any size and be suitably selected to suit to the size of the intermediate transfer body.

The Martens hardness of the polyurethane rubber in the cleaning blade of the present disclosure is not particularly limited and can be appropriately selected according to the purpose. It is preferably in the range of 0.5 ($N/mm^2$) to 2 ($N/mm^2$). Ensuring that the Martens hardness of the polyurethane rubber in the cleaning blade falls within the desired range can resolve issues such as cleaning defects caused by difficulty in achieving a desired blade line pressure or by an increased contact area with the image bearer, as well as problems such as chipping resulting from the blade substrate becoming excessively stiff.

The method of manufacturing the blade substrate is not particularly limited and can be suitably selected according to the specific application. One such method involves preparing a polyurethane prepolymer by reacting a polyol compound with a polyisocyanate compound, adding a curing agent and optionally a curing catalyst to the prepolymer, centrifugally molding the resulting mixture in a specified mold, allowing it to age at room temperature, and finally cutting the cured material into flat plates of predetermined dimensions.

The polyol compound is not particularly limited and can be suitably selected to suit to a particular application. They include low molecular weight polyols and high molecular weight polyols.

Specific examples of the polyol having a large molecular weight include, but are not limited to, polyester polyol, i.e., a condensation of an alkylene glycol and a aliphatic dibasic acid such as polyester-based polyols such as polyester polyols of alkylene glycol and adipic acid such as ethlylene adipate ester polyol, butylene adipate ester polyol, hexylene adipate ester polyol, ethylene propylene adipate ester polyol, ethylene butylene adipate ester polyol, and ethylene neopentylene adipate ester polyol; polycaprolactone based polyols such as polycaprolactone ester polyols obtained by ring-opening polymerization of caprolactone; and polyether-based polyols such as poly (oxytetramethylene) glycol, and poly (oxypropylene) glycol. These can be used alone or in combination.

Specific examples of the polyol having a low molecular weight include, but are not limited to, diols such as 1,4-butane diol, ethylene glycol, neopentyl glycol, hydroxynone-bis(2-hydroxyethyl)ether, 3,3'-dichloro-4,4'-diamino diphenyl methane, 4,4'-diaminodiphenyl methane, and tri- or higher alcohols such as 1,1-trimethylol propane, glycerine, 1,2,6-hexane triol, 1,2,4-butane triol, tirmethylol ethane, 1,1,1-tris(hydroxyethyoxymethyl)propane, diglycerine, and pentaerythritol. These can be used alone or in combination.

The polyisocyanate compound is not specifically limited and can be chosen appropriately according to the purpose. Specific examples include, but are not limited to, methylene diphenyl diisocyanate (MDI), toluene diisocyanate (TDI), xylene diisocyanate (XDI), naphthalene-1,5-diisocyanate (NDI), tetramethylxylylene diisocyanate (TMXDI), isophorone diisocyanate (IPDI), hydrogenated xylene diisocyanate (H6XDI), dicyclohexylmethane diisocyanate (H12MDI), hexamethylene diisocyanate (HDI), dimer acid diisocyanate (DDI), norbornene diisocyanate (NBDI), and trimethylhexamethylene diisocyanate (TMDI). These can be used alone or in combination.

The curing agent is not particularly limited and can be suitably selected to suit to a particular application. It includes amines and alcohols. These can be used alone or in combination. The curing agent can act to adjust the hardness of the blade substrate.

The curing catalyst is not particularly limited and can be suitably selected to suit to a particular application. It includes 2-methylimidazole and 1,2-dimethyl imidazole. The proportion of the curing catalyst is not particularly limited and can be suitably selected to suit to a particular application. It is preferably from 0.01 to 0.5 percent by mass and more preferably from 0.05 to 0.3 percent by mass to the entire mass of the prepolymer and the curing agent.

The rebound resilience of the elastic member (elastic cleaning blade substrate), measured in compliance with JIS K6255 (Rubber, vulcanized or thermoplastic—Determination of rebound resilience), is not particularly limited and can be suitably selected according to the specific application. Preferably, it is between 10 percent and 80 percent at 23 degrees Celsius. If the rebound resilience is within this desired range, issues such as cleaning defects caused by insufficient flexibility of the blade substrate—resulting in its inability to adapt to the oscillation and roughness of the image bearer—can be eliminated. Additionally, excessive rebound, which can cause blade creaking (abnormal noise), is also prevented. The rebound resilience coefficient of the blade substrate can be measured, for instance, using a No. 221 resilience tester (available from Toyo Seiki Seisaku-sho, Ltd.) in accordance with JIS K6255 mentioned above at 23 degrees Celsius.

Maximum Indentation Depth Hmax of the Indenter

For the cleaning blade described in the present disclosure, the maximum indentation depth hmax of the indenter at a position 100 μm inward from the front edge ridge part is preferably between 4.0 μm and 10.0 μm. This range ensures that the coating layer becomes sufficiently brittle and prone to collapse. The hmax value at the position 100 μm inward from the front edge ridge part of the edge layer in the cleaning blade is preferably between 5.5 μm and 7.5 μm, achieving a balance between sliding performance and cleaning efficiency through the collapsibility of the coating layer. If the hmax at this position is at least 4.0 μm, the coating layer becomes prone to collapse, so that cleaning performance can be maintained even during continuous high-density image printing. If the hmax is less than 4.0 μm, the coating layer resists collapsing, resulting in an inability to maintain the cleaning performance during continuous high-density image printing. On the other hand, if the hmax exceeds 10.0 μm, the coating layer collapses too easily, leading to issues such as impaired sliding performance or unintended detachment of the coating layer from the cleaning blade, even when not in operation. In the present disclosure, Martens hardness is measured on a product processed to function as a cleaning blade.

Measurement of Maximum Indentation Depth Hmax

The maximum indentation depth hmax of the indenter is measured in accordance with ISO 14577 using a nanoindenter (ENT-3100, available from ELIONIX INC.) equipped with a Berkovich indenter. The measurement involves pressing the indenter under a load of 1,000 μN over 10 seconds, holding the load for 5 seconds, and then releasing the load over 10 seconds at the same loading rate. The hmax value is calculated from the load-displacement curve. The measurement location on the edge layer is set at a position 100 μm inward from the front edge ridge (contact portion) 62*c* of the edge layer, as illustrated in FIG. 4. The loading rate increases at a constant speed from 0 μN to 1,000 μN over 10 seconds.

Measuring Martens Hardness

There are no specific restrictions on the measurement location for the Martens hardness in the base layer of the cleaning blade. However, for ease of measurement, a position 100 μm inward from the side end of the base layer is used. The Martens hardness value is determined as the median of measurements taken at 4 to 6 points at the specified location. The measurement conditions are the same as those described in Measurement of Maximum Indentation Depth hmax measurement.

Intermediate Transfer Body

The intermediate transfer body relating to the present disclosure is where a toner image obtained by developing a latent image formed on an image bearer and includes an intermediate transfer belt and a secondary transfer belt, for example. It contains a resin, an electrical resistance adjusting agent, and other optional components.

Resin

From the perspective of flame resistance, examples of the aforementioned resins include, but are not limited to, fluororesins such as PVDF and ETFE, as well as polyimide resins and polyamide-imide resins. Among these, polyimide resins or polyamide-imide resins are preferred for their mechanical strength (high elasticity) and heat resistance. There are no particular restrictions on the polyimide or polyamide-imide resins, and they can be appropriately selected according to the purpose. For example, general-purpose products from manufacturers such as DU PONT-TORAY CO., LTD., Ube Industries, Ltd., New Japan Chemical co., ltd., JSR Corporation, Unitika Ltd., I.S.T Corporation, Hitachi Chemical Co., Ltd., TOYOBO CO., LTD., and Arakawa Chemical Industries, Ltd. can be procured and used.

Electrical Resistance Adjusting Agent

As for the electrical resistance adjusting agents, there are no particular restrictions, and they can be appropriately selected according to the purpose. Examples include, but are not limited to, metal oxides, carbon black, ionic conductive agents, and conductive polymers. Specific examples of the metal oxides include, but are not limited to, zinc oxide, tin oxide, titanium oxide, zirconium oxide, aluminum oxide, and silicon oxide. To improve dispersibility, metal oxides with pre-applied surface treatments may also be used. Specific examples of carbon black include, but are not limited to, Ketjenblack, furnace black, acetylene black, thermal black, and gas black.

Specific examples of ionic conductive agents include, but are not limited to, tetraalkylammonium salts, trialkylbenzylammonium salts, alkylsulfonates, alkylbenzenesulfonates, alkyl sulfates, glycerin fatty acid esters, sorbitan fatty acid esters, polyoxyethylene alkylamines, polyoxyethylene fatty alcohol esters, alkyl betaines, and lithium perchlorate. Specific examples of conductive polymers include, but are not limited to, polyparaphenylene, polyaniline, polythiophene, and polyparaphenylenevinylene. The electrical resistance adjusting agents may be used individually or in combination of two or more types.

The content of the electrical resistance adjusting agents in the base layer of the intermediate transfer body is not particularly limited and can be appropriately selected based on the purpose. For instance, if the electrical resistance adjusting agent is carbon black, the content is preferably 10 to 25 mass percent relative to the base layer, more preferably 15 to 20 mass percent. If the electrical resistance adjusting agent is a metal oxide, the content is preferably 1 to 50 percent by mass, more preferably 10 to 30 percent by mass. If the content is equal to or above the lower limit of the preferred range, the effect of adjusting electrical resistance is achieved. If it is equal to or below the upper limit, favorable mechanical strength of the intermediate transfer belt is obtained.

Other Optional Components

Examples of other optional components include, but are not limited to, dispersing agents, reinforcing agents, lubricants, heat-conducting agents, and antioxidants.

The average thickness of the base layer is not particularly limited and can be appropriately selected based on the purpose. For example, a range of 30 μm to 150 μm is preferred, 40 μm to 120 μm is more preferred, and 50 μm to 80 μm is particularly preferred. If the average thickness of the base layer is between 30 μm and 150 μm, it is advantageous in terms of the durability of the intermediate transfer belt. Furthermore, to enhance running stability, it is preferable to minimize thickness unevenness in the base layer.

There are no particular restrictions on the method of measuring the average thickness of the base layer, and the method can be appropriately selected depending on the purpose. Specific examples include, but are not limited to, measurement using contact-type or eddy-current thickness gauges or observing the cross-section of the film with a scanning electron microscope (SEM).

Image Forming Apparatus and Image Forming Method

The image forming apparatus includes an image bearer, a charging device to charge the surface of the image bearer, an irradiator to irradiate the surface of the image bearer charged to form a latent electrostatic image, a developing device to develop the latent electrostatic image with toner to form a visible image, a transfer device including an intermediate transfer body to transfer the visible image to a recording medium, a fixing device to fix the image transferred to the recording medium, a cleaning device to remove residual matter on the intermediate transfer body, and other optional devices. A combination of the charging device and the irradiator is also referred to as a latent electrostatic image forming device. The cleaning device has the cleaning blade of the present disclosure.

The image forming method related to the present disclosure includes a charging process, an irradiation process, a development process, a transfer process, a cleaning process, a protection layer formation process, a fixing process, and other optional processes. A combination of the charging process and the irradiation process are also referred to as a latent electrostatic image formation process.

The image formation method of the present disclosure is suitably performed by the image forming apparatus of the present disclosure. The charging process is performed by the charging device. The irradiation process is performed by the irradiation device. The development process is performed by the development device. The transfer process is performed by the transfer device. The cleaning process is performed by the cleaning device. The cleaning device includes the charging blade of the present disclosure. In addition, the other processes are suitably conducted by the other corresponding devices.

Image Bearer

The size and structure of the image bearer is not particularly limited, and it can be suitably selected among the devices known in the art to suit to a particular application. The shape of the image bearer is not particularly limited and can be suitably selected to suit to a particular application. For example, it can take a drum-like shape and a belt-like shape. There is not specific limitation on the materials of the image bearer, and it can be suitably selected to suit to a particular application. Specific examples include, but are not limited to, inorganic compounds such as amorphous silicon and selenium for an inorganic photoconductor and organic compounds such as polysilane and phthalopolymethine for an organic photoconductor (OPC). An example of the organic photoconductor is a layered photoconductor, including layers—a charge-generation layer formed of non-metallic materials like phthalocyanines or titanyl phthalocyanines dispersed in a binder resin and a charge-transport layer formed of charge transport materials dispersed in a binder resin—stacked on a substrate such as an aluminum drum.

Another type is a single-layer photoconductor with a single-layer structure on a substrate, featuring a photosensitive layer formed of both charge-generation and charge-transport materials dispersed in a binder resin.

In the single-layer photoconductor, hole transport agents and electron transport agents can be added to the photosensitive layer as charge transport materials.

Additionally, an undercoat layer may be provided between the substrate and either the charge generation layer of a multi-layer photoconductor or the photosensitive layer of a single-layer photoconductor.

Charging Process and Charging Device

The charging process involves charging the surface of an image bearer, which is carried out by the charging device. The charging device is not particularly limited and can be suitably selected to suit to a particular application as long as it is capable of charging the surface of the image bearer.

Specific examples include, but are not limited to, a known contact type charger that includes an electroconductive or semiconductive roller, brush, film, or a rubber blade, and a non-contact type charger using corona discharging such as corotron and scorotron.

The shape of the charging device may vary. For example, it can take the form of rollers, magnetic brushes, and fur brushes, and can be selected according to the specifications and configuration of an electrophotographic image forming apparatus. If a magnetic brush is used, the magnetic brush is formed of a charging member made of, for example, ferrite particles such as Zn—Cu ferrite, a non-magnetic electroconductive sleeve to support the charging member, and a magnet roll disposed inside the electroconductive sleeve.

If a fur brush is used, fur electroconductively-treated by carbon, copper sulfide, metal, or metal oxide is used as fur brush material, which is rolled round or attached to metal or electroconductively treated core metal to obtain the charging member.

The charger is not limited to the contact type charger described above, but using such a contact type charger is preferable to obtain an image forming apparatus with such a charger producing a less amount of ozone. It is preferable to apply a direct voltage or a voltage obtained by superimposing an alternating voltage to a direct voltage to the surface of the image bearer by the charger arranged in contact with or in the vicinity of the latent image bearer. The charging device is preferably a charging roller disposed in contact with the image bearer with a gap tape therebetween. It is preferable that the charging roller apply a direct voltage on which an alternate voltage is superimposed to charge the surface of the image bearer.

Irradiation Process and Irradiation Device

The irradiation (exposing) process involves irradiating the surface of a charged image bearer with beams of light, and is carried out by the irradiator. Irradiation is conducted by irradiating the surface of the latent image bearer according to data information using the irradiation device. In exposure, the optical system can be broadly classified into analog optical systems and digital optical systems. The analog optical system directly projects the original document onto the surface of an image bearer. The digital optical system receives image information as electrical signals, converts the electrical signals into optical signals, and exposes and forms images on an image bearer.

As for the exposure device, as long as it is capable of exposing the charged image bearer to form a latent electrostatic image, there is no particular limitation, and various exposure devices such as a copying optical system, a rod lens array system, a laser optical system, a liquid crystal shutter optical system, and an LED optical system can be selected to suit to a particular application. Embodiments of the present disclosure can employ a dorsal irradiation system, where the latent image bearer is irradiated from the rear side in an imagewise manner.

Developing Process and Developing Device

The developing process involves developing a latent electrostatic image into a toner image, and is carried out by the developing device. The developing device is not particularly limited and can be suitably selected to suit to a particular application as long as it is capable of developing a latent electrostatic image into a toner image. Various options can be selected depending on the purpose. They include a developing device that houses toner and is capable of applying the toner to the electrostatic latent image either in contact or non-contact manner. The developing device may be of dry or wet development type, and may be monochrome or multi-color. For example, it may include a mixer for triboelectrically charging the toner, and a rotatable magnetic roller. Within the developing device, the toner and carrier are mixed and stirred as needed, resulting in the toner becoming charged due to friction. The charged toner is held in a filament-like state on the surface of the rotating magnetic roller, forming a magnetic brush. The magnetic roller is positioned near the image bearer, so some of the toner forming the magnetic brush on the surface of the magnetic roller is moved to the surface of the image bearer by the electrostatic attraction force of the latent electrostatic image. As a result, the latent electrostatic image is developed into a toner image on the surface of the image bearer. The toner housed in the developing device may be a developing agent containing the toner mentioned above, which can be a single-component or two-component developing agent. Additionally, the toner can be used as a single-component magnetic toner without using a carrier, or as a non-magnetic toner.

As a development method, a premix development system, in which a premixed developing agent containing toner and carrier mixed in advance is supplied, may be adopted. In the premix development system, the excess developing agent, corresponding to the increase in carrier within the developing unit, is ejected as surplus developing agent. This system gradually refreshes the developing agent within the developing unit. Thus, it is possible to extend the replacement cycle associated with developing agent deterioration and reduce the effort required for developing agent replacement.

Transfer Process and Transfer Device

The transfer process involves transferring the toner image onto a recording medium, and is carried out by the transfer device. The transfer process preferably includes a primary transfer process, in which the toner image is transferred onto the surface of an intermediate transfer member to form a composite transfer image, and a secondary transfer process, in which the composite transfer image is transferred onto the recording medium. As for the transfer device, there is no particular limitation as long as it is capable of transferring the toner image onto the recording medium. Depending on the purpose, it is preferable to have a transfer device including a primary transfer device for transferring the toner image onto the surface of the intermediate transfer member to form a composite transfer image, and a secondary transfer device for transferring the composite transfer image onto the recording medium. The transfer device (the primary transfer device and the secondary transfer device) preferably has at least a transfer unit that peels off and charges the toner image formed on the surface of the image bearer onto the recording medium. The transferring device is not particularly limited and can be suitably selected to suit to a particular application. It includes a corona transferring device using corona discharge, a transfer belt, a transfer roller, a pressure transfer roller, and an adhesive transferring device. One or more transfer devices can be provided.

A typical example of the recording paper is plain paper but any paper to which a non-fixed image after development can be transferred can be used. PET base for an overhead projector can be also used.

Fixing Process and Fixing Device

The fixing process involves fixing the toner image transferred onto the recording medium, and is carried out by the fixing device. If using two or more colors of toner, each color of toner may be fixed each time it is transferred onto the recording medium, or all colors of toner may be fixed after being transferred and stacked on the recording medium. The fixing device is not particularly limited and can be suitably selected to suit to a particular application as long as it is capable of fixing the toner image transferred onto the recording medium. The thermal fixing method using a known heating and pressure device can be employed. The heating and pressure device is not particularly limited and can be suitably selected to suit to a particular application. For example, combinations of heating rollers and pressure rollers, or combinations of heating rollers, pressure rollers, and endless belts can be used. The heating temperature can be selected appropriately depending on the purpose and, preferably, ranges from 80 to 200 degrees C. Depending on particular applications, for example, a known optical fixing device can be used together with the fixing device.

Cleaning Process and Cleaning Device

The cleaning process involves removing the toner remaining on the surface of the intermediate transfer body, and is carried out by the cleaning device. As the cleaning device, a cleaning blade of the present disclosure fixed to a supporting member is used.

The line pressure applied by the cleaning substrate of the cleaning blade of the present disclosure onto the surface of the image bearer can be selected as appropriate depending on the purpose, with no specific limitations. It preferably ranges from 10 to 100 N/m and more preferably from 10 to 50 N/m. A linear pressure between 10 N/m and 100 N/m reduces the likelihood of cleaning defects, such as toner slipping through the contact portion and the intermediate transfer body. At the same time, it also helps to suppress the flipping of the elastic member (elastic cleaning blade substrate). The line pressure can be measured, for example, using a measurement device incorporating a small compression-type load cell available from Kyowa Electronic Instruments Co., Ltd.

The angle formed between the tangent of the image bearer at the position where the contact portion of the cleaning substrate of the cleaning blade is brought into contact and the front surface of the free end of the blade substrate in the cleaning blade is not particularly limited and can be suitably selected to suit to a particular application. It is preferably between 65 degrees and 85 degrees. This angle is referred to as the “cleaning angle” hereinafter. The cleaning angle between 65 degrees and 85 degrees is preferable to reduce the occurrence of blade turning-up and consequently minimize the occurrence of cleaning defects.

Other Processes and Other Devices

The other processes may include, for example, a quenching process, a recycling process, and a control process. The other devices include, for example, a quencher, a recycling device, and a control device.

Discharging (Quenching) Process and Discharging (Quenching) Device

The quenching process applies a quenching bias to an image bearer using a quencher. The quencher is not particularly limited as long as it can apply a quenching bias to a latent electrostatic image bearer. It is not particularly limited and can be suitably selected to suit to a particular application, including a quenching (discharging) lamp.

Recycling Process and Recycling Device

In the recycling process, the toner removed in the cleaning process mentioned above is returned to the developing device for re-use. This recycling process is suitably conducted by a recycling device. The recycling device is not particularly limited and can be suitably selected among conveyors known in the art to suit to a particular application.

Control Process and Control Device

The control process mentioned above is to control each process and can be suitably conducted by the control device. The control device is not particularly limited and can be suitably selected to suit to a particular application. Any control device able to control the behavior of each device can be used. For example, devices such as a sequencer and a computer can be listed.

An example of the image forming apparatus of the present disclosure is described with reference to the drawings. The application of the cleaning blade described in the present disclosure is not limited to these embodiments.

In the drawings, identical components may be denoted by the same reference numerals (or symbols), and redundant descriptions may be omitted. Additionally, the present disclosure is not restricted to the specific numbers, positions, or shapes of the configurations described below. These parameters may be appropriately selected to suit the implementation of the present disclosure.

Figure 5:
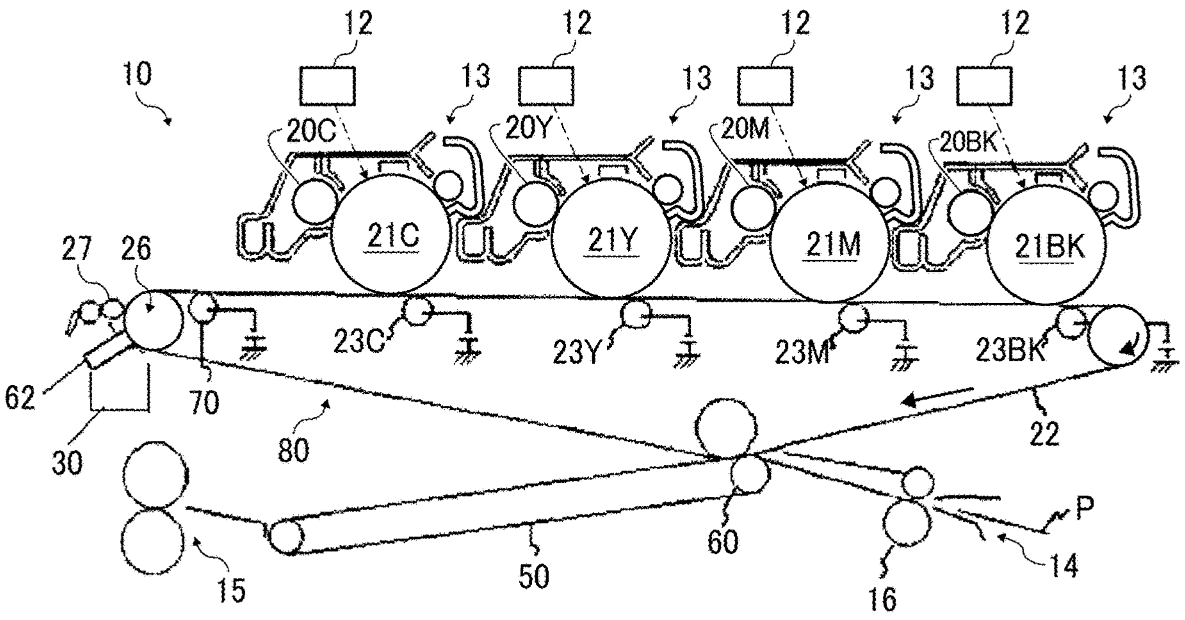
FIG. 5 is a schematic diagram illustrating a cross-sectional view of an example of the image forming apparatus of the present disclosure.

FIG. 5 is a schematic diagram illustrating a configuration example of the image forming apparatus 10 for use in the present disclosure. This image forming apparatus 10 includes four image forming units, 1Y, 1M, 1C, and 1K, for yellow, magenta, cyan, and black (hereinafter referred to as Y, M, C, and BK). These units use toners of different colors, Y, M, C, K, as imaging substances to form images, but otherwise have similar configurations.

Each image forming unit include a drum photoconductor 21 (a cyan drum photoconductor 21C, a yellow drum photoconductor 21Y, a magenta drum photoconductor 21M, and a black drum photoconductor 21BK), a charging unit for uniformly charging the drum photoconductor 21, an irradiator 12 that irradiates the drum photoconductor 21 based on the image information of each color to form latent images of each color on the drum photoconductor 21, a developing device 20 (a cyan developing device 20C, a yellow developing device 20Y, a magenta developing device 20M, and a black developing device 20BK) that serves as the developing unit to develop the latent images with the respective color toners to form toner images, a transfer charger for transferring the toner images onto the intermediate transfer belt 22, a cleaning device 13, and a discharge lamp.

The charging device is a charging member, while the developing device 20 tonerizes latent images formed on the surface of the drum photoconductor 21. The cleaning device 13 removes residual toner on the surface of the drum photoconductor 21 after toner images are transferred to the intermediate transfer belt 22. The discharging (quenching) lamp functions as a discharging device to discharge the surface potential of the drum photoconductor 21 after cleaning.

Although the drum photoconductor 21 has a drum-like form, it may employ a sheet form or an endless belt form.

Below each imaging unit, an intermediate transfer unit 80 equipped with the intermediate transfer belt 22 is disposed as an intermediate transfer body. The intermediate transfer belt 22 is an endless belt stretched over three rollers 26 and can move in the direction indicated by an arrow in FIG. 5. In the vicinity of the intermediate transfer belt 22, transfer rollers 23 (a cyan transfer roller 23C, a yellow transfer roller 23Y, a magenta transfer roller 23M, and a black transfer roller 23BK) are arranged to face the intermediate transfer belt 22. A transfer bias (secondary transfer bias) can be applied to transfer the developed image (toner image) onto recording paper P, which serves as the recording medium.

The intermediate transfer belt 22 may also include an elastic intermediate transfer belt. The elastic intermediate transfer belt can have a structure in which a flexible elastic layer is laminated on a relatively rigid base layer with sufficient bendability.

Additionally, to prevent the intermediate transfer belt 22 from meandering, a guide member may be provided on its inner peripheral surface.

In the vicinity of the roller 26, an intermediate transfer body cleaning blade 25 for removing toner remaining on the intermediate transfer belt 22 after the toner image has been transferred onto the recording paper P, and a lubricant application unit 27, which is a mechanism for applying a lubricant (such as zinc stearate) to the intermediate transfer body, are arranged. The intermediate transfer body cleaning blade 25 is in contact with the intermediate transfer belt 22 in a counter direction relative to the surface movement direction of the intermediate transfer belt 22. The detail of the intermediate transfer body cleaning blade 25 is the same as described above.

A secondary transfer device is disposed facing each of the imaging units with the intermediate transfer belt 22 therebetween. The secondary transfer device is equipped with a secondary transfer belt 50. The secondary transfer belt 50 is an endless belt stretched over a pair of rollers 60. It enables the recording paper P, conveyed onto the secondary transfer belt 50 by the paper feeding unit 14 and the registration roller 16, to come into contact with the intermediate transfer belt 22 between the roller 26 and the roller 60. Near the secondary transfer belt 50 is provided a fixing device 15.

The belt cleaning unit 30 includes a cleaning blade 62, and may optionally be provided with the lubricant application unit 27 and a collecting device to receive toner and other residues removed by the cleaning blade. A structure such as a dish-shaped tray can be used as the collecting device.

The terms of image forming, recording, and printing in the present disclosure represent the same meaning.

Also, recording media, media, and print substrates in the present disclosure have the same meaning unless otherwise specified.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

The present disclosure is described next in detail with reference to Examples and Comparative Examples but is not limited to these Examples. "Parts" represents percent by mass unless otherwise specified.

The elastic cleaning blade substrate illustrated in FIG. 4 with an elastic edge layer and a base layer.

Preparation of Particle Dispersion for Forming Coating Layer

Preparation of Particle Dispersion A

Particle dispersion A was prepared by placing 6.8 parts of polytetrafluoroethylene (PTFE) micro powder (TF9201Z, available from 3M Company, with a volume average particle size of 200 nm) as particles, 0.2 parts of a terpolymer of VdF-HFP-TFE consisting of vinylidene fluoride (VdF), hexafluoropropylene (HFP), and tetrafluoroethylene (TFE) as a binding component, and 93.0 parts of 1,1,2,2-tetrafluoroethyl 2,2,2-trifluoroethyl ether (HFE-347; available from Tokyo Chemical Industry Co. Ltd.) as a fluorine dispersion solvent, into a screw tube, followed by stirring with a stirrer.

Preparation of Particle Dispersion B

Particle dispersion B was prepared by placing 6.9 parts of polytetrafluoroethylene (PTFE) micro powder (TF9201Z, available from 3M Company, with a volume average particle size of 200 nm) as particles, 0.1 parts of a terpolymer of VdF-HFP-TFE as a binding component, and 93.0 parts of 1,1,2,2-tetrafluoroethyl 2,2,2-trifluoroethyl ether (HFE-347; available from Tokyo Chemical Industry Co. Ltd.) as a fluorine dispersion solvent, into a screw tube, followed by stirring with a stirrer.

Preparation of Particle Dispersion C

Particle dispersion C was prepared by placing 5.8 parts of polytetrafluoroethylene (PTFE) micro powder (TF9201Z, available from 3M Company, with a volume average particle size of 200 nm) as particles, 1.2 parts of a terpolymer of VdF-HFP-TFE as a binding component, and 93.0 parts of 1,1,2,2-tetrafluoroethyl 2,2,2-trifluoroethyl ether (HFE-347; available from Tokyo Chemical Industry Co. Ltd.) as a fluorine dispersion solvent, into a screw tube, followed by stirring with a stirrer.

Preparation of Particle Dispersion D

Particle Dispersion D was prepared by placing 97.0 parts of a water dispersion of polymethyl methacrylate (PMMA) particles (MX100W, available from NIPPON SHOKUBAI CO., LTD., with a volume average particle size of 150 nm) and 3.0 parts of polyvinyl butyral (PVB) resin (Eslec KW-10, available from SEKISUI CHEMICAL CO., LTD., with an acetalization degree of 9±2 mol) as a binding component into a screw tube and stirring with a stirrer or similar device.

Preparation of Particle Dispersion E

Particle Dispersion E was prepared by placing 95.0 parts of a water dispersion of polymethyl methacrylate (PMMA) particles (MX100W, available from NIPPON SHOKUBAI CO., LTD., with a volume average particle size of 150 nm) and 5.0 parts of polyvinyl alcohol (PVA) resin (Poval JP-03, available from JAPAN VAM & POVAL CO., LTD., with a saponification degree of 88±2 mol) as a binding component into a screw tube and stirring with a stirrer or similar device.

Example 1

Preparation of Blade Substrate in Cleaning Blade

For the edge layer and the base layer, a polyurethane elastomer sheet obtained by centrifugal molding, curing, and post-crosslinking was used. The average thickness and Martens hardness (HM) of the edge layer and the base layer are as follows:

Average thickness: 2.0 (mm)

Martens hardness (HM) of the edge layer: 0.5 (N/mm$^2$)

Martens hardness (HM) of the base layer: 1.1 (N/mm$^2$)

The blade substrate was prepared by bonding the edge layer and the base layer. Additionally, the blade substrate was attached to a metal plate.

Forming Coating layer: Dipping

Figure 6:
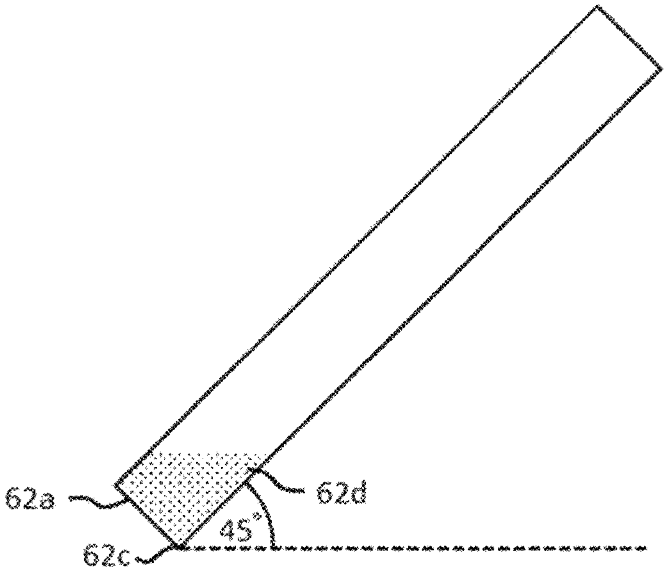
FIG. 6 is a schematic diagram illustrating a method of forming the coating layer in Examples of the present disclosure described later.

One end surface of the cleaning blade, used as the front edge on the peripheral side (hereinafter referred to as the cleaning blade front edge surface), was immersed perpendicularly to the horizontal plane into Particle Dispersion A to a depth of 2 (mm) from the cleaning blade front edge surface and then withdrawn at a withdrawal speed of 1 (mm/s). To collect PTFE particles necessary for the cleaning performance on the portion including the contact edge of the cleaning blade front edge surface, the blade was tilted approximately 45 degrees as illustrated in FIG. 6 and dried at room temperature (25 degrees Celsius) for 30 minutes, thereby fabricating the cleaning blade of Example 1.

The thickness of the coating layer was 0.5 μm.

Examples 2 to 7 and Comparative Examples 1 to 3

Cleaning blades of Examples 2 to 7 and Comparative Examples 1 to 3 were fabricated in the same manner as in Example 1, except that the type of particle dispersion, the Martens hardness of the base layer, and the average thickness of the coating layer were modified as shown in Table 1.

The thickness of the coating layer was adjusted by the withdrawal speed during dipping. Increasing the withdrawal speed results in an increased thickness.

In Comparative Example 1, the cleaning blade had a blade substrate without a coating layer.

Assembly of Image Forming Apparatus

The cleaning blades obtained from Examples 1 to 7 and Comparative Examples 1 to 3 were installed in the intermediate transfer unit of a color multifunction peripheral (imagio MP C4500, available from Ricoh Co., Ltd.) (with a printer section similar in structure to the image forming apparatus 10 illustrated in FIG. 5), and the image forming apparatus was thus assembled. The cleaning blade was attached to the image forming apparatus at a line pressure of 20 g/cm and a cleaning angle of 81 degrees.

Measurement of Maximum Penetration Depth hmax of Indenter

The maximum penetration depth hmax of the indenter for the edge layers of the cleaning blades obtained from Examples 1 to 7 and Comparative Examples 1 to 3 was measured.

The method of measuring hmax was executed as described in the earlier section, "Measurement of Maximum Penetration Depth hmax of Indenter." The hmax values shown in Table 1 represent the median of measurements taken at 4 to 6 points at each measurement location.

Measuring Martens Hardness

The Martens hardness of the base layers of the cleaning blades obtained from Examples 1 to 7 and Comparative Examples 1 to 3 was measured. The measurement conditions for the Martens hardness (HM) were the same as those for the measurement of the maximum penetration depth hmax described earlier. The results are shown in Table 1. The measurement locations for the Martens hardness of the base layer were at a distance of 100 μm inward from the end of the base layer. The Martens hardness values represent the median of measurements taken at 4 to 6 points at each measurement location.

Measuring of Average Thickness of Coating Layer

The average thickness of the coating layers of the cleaning blades obtained from Examples 1 to 7 and Comparative Examples 1 to 3 was measured. The results are shown in Table 1. The measurement method involved removing part of the coating layer using a spatula or cotton swab and performing shape measurement using a contact-type surface roughness tester (SurfTest SJ-500, available from Mitutoyo).

Evaluation of Torque Increase Rate

The assembled image forming apparatus was used to output prints under the following conditions, and the rate of change in the drive torque increase of the intermediate transfer body was measured. After printing, the front edge (front end) of the cleaning blade was observed using a laser microscope (LEXT OLS4500, available from Olympus Corporation), and the torque increase rate was evaluated based on the following evaluation criteria. The evaluation results are listed in Table 1. The term "initial" in the evaluation criteria refers to the period during which the first 500 sheets are output.

Environment: 23 degrees Celsius/45 percent RH

Paper conditions: blank paper chart

Number of prints: 5,000 sheets (A4 size, horizontal orientation)

Evaluation Criteria

S: The rate of change in torque increase is within 50 compared to the initial stage, and there is no stalling of the intermediate transfer body caused by the increase in driving torque. Furthermore, no traces of turning-up were observed on the cleaning blade edge after output.

A: The rate of change in torque increase is within 50 compared to the initial stage, and there is no stalling of the intermediate transfer body caused by the increase in driving torque. However, traces of peeling were observed on the cleaning blade front edge after output, but they were not significant enough to cause toner to slip through, making it acceptable for practical use.

C: The intermediate transfer body stalled due to the increase in torque, and traces of turning-up sufficient to cause toner to slip through were observed on the cleaning blade front edge after output, making it unacceptable for practical use.

Evaluation on Image Quality (Cleaning Property)

The assembled image forming apparatus was used to output prints under the following conditions. Subsequently, the front edge of the cleaning blade and the surface of the intermediate transfer body were observed using a laser microscope (LEXT OLS4500, available from Olympus Corporation), and evaluations were made based on the following criteria. The evaluation results are listed in Table 1.

Environment: 27 degrees Celsius/80 percent RH

Paper conditions: continuous full solid images

Number of prints: 2,000 sheets (A4 size, horizontal orientation)

Evaluation Criteria

S: Toner that failed to be stopped properly and slipped through was not visually detectable on the printed paper or the intermediate transfer body. Even under microscopic observation of the intermediate transfer body in the longitudinal direction, no streaks of toner were detected.

A: Toner that failed to be stopped properly and slipped through was not visually detectable on the printed paper or the intermediate transfer body. However, microscopic observation of the intermediate transfer body in the longitudinal direction revealed streaks of toner that had passed through.

C: Toner that failed to be stopped properly and slipped through was visually detectable on the printed paper or the intermediate transfer body.

TABLE 1

| | | | Example | | | | | | |
|---|---|---|---|---|---|---|---|---|---|
| | | | 1 | 2 | 3 | 4 | 5 | 6 | 7 |
| Coating layer | Particle dispersion for forming coating layer | | A | B | C | A | B | D | E |
| | Particle | PTFE (particle size: 0.200 (μm) | 6.8 | 69 | 5.8 | 6.8 | 6.9 | — | — |
| | | PMMA (particle size: 0.150 (μm) | — | — | — | — | — | 97.0 | 95.0 |
| | Binding component | VdF-HFP-TFE | 0.2 | 0.1 | 1.2 | 0.2 | 0.1 | — | — |
| | | Polyvinylbutyral | — | — | — | — | — | 3.0 | — |

TABLE 1-continued

| | | | | | | | | | |
|---|---|---|---|---|---|---|---|---|---|
| | | Polyvinyl alcohol | — | — | — | — | — | — | 5.0 |
| | Dispersion solvent | 1,1,2,2-Tetrafluoroethyl-2,2,2-trifluroethyl ether | 93.0 | 93.0 | 93.0 | 93.0 | 93.0 | 92.0 | 92.0 |
| | Average thickness (μm) | | 0.5 | 6.5 | 4 | 4.0 | 10.0 | 7.5 | 7.0 |
| Blade substrate | Martens hardness at base layer ($N/mm^2$) | | 1.1 | 2.0 | 2.0 | 0.5 | 1.5 | 0.5 | 0.5 |
| Evaluation | Maximum penetration depth hmax (μm) of indenter in edge layer | | 4.0 | 7.7 | 4.5 | 7.0 | 10.0 | 8.2 | 9.0 |
| | Torque increase rate | | A | S | A | S | S | A | A |
| | Cleaning performance | | S | A | A | S | A | A | A |

| | | | Comparative Example | | |
|---|---|---|---|---|---|
| | | | 1 | 2 | 3 |
| Coating layer | Particle dispersion for forming coating layer | | — | B | C |
| | Particle | PTFE (particle size: 0.200 (μm) | — | 6.9 | 5.8 |
| | | PMMA (particle size: 0.150 (μm) | — | — | — |
| | Binding component | VdF-HFP-TFE | — | 0.1 | 1.2 |
| | | Polyvinylbutyral | — | — | — |
| | | Polyvinyl alcohol | — | — | — |
| | Dispersion solvent | 1,1,2,2-Tetrafluoroethyl-2,2,2-trifluroethyl ether | — | 93.0 | 93.0 |
| | Average thickness (μm) | | — | 10.5 | 0.5 |
| Blade substrate | Martens hardness at base layer ($N/mm^2$) | | 2.0 | 0.5 | 2.0 |
| Evaluation | Maximum penetration depth hmax (μm) of indenter in edge layer | | 3.0 | 10.5 | 3.5 |
| | Torque increase rate | | C | A | C |
| | Cleaning performance | | S | C | A |

Aspects of the present disclosure are, for example, as follows.

Aspect 1

A cleaning blade includes an elastic cleaning blade substrate including an edge layer and a coating layer on the front end portion of the elastic cleaning blade substrate that is in contact with the cleaning target to clean the surface of the cleaning target, the coating layer including a front edge ridge part and a cleaning blade supporting member to support the elastic cleaning blade substrate, wherein the maximum penetration depth hmax of the indenter of a microhardness tester is between 4.0 μm and 10.0 μm at a position 100 μm inward from the front edge ridge part on the undersurface of the elastic cleaning blade substrate as measured according to a nanoindentation hardness test.

Aspect 2

The cleaning blade according to Aspect 1 mentioned above, wherein the maximum penetration depth hmax is between 5.5 μm and 7.5 μm as measured in accordance with the nanoindentation hardness test.

Aspect 3

The cleaning blade according to Aspect 1 or 2 mentioned above, wherein the coating layer on the undersurface has a thickness between 0.5 μm and 10 μm at the position 100 μm inward from the front edge ridge part.

Aspect 4

The cleaning blade according to any one of Aspects 1 to 3 mentioned above, wherein the coating layer comprises particles and a resin binding the particles and the elastic cleaning blade substrate.

Aspect 5

The cleaning blade according to any one of Aspects 1 to 4 mentioned above, wherein the coating layer comprises an applied film comprising PTFE particles and a fluororesin or acrylic particles and polyvinyl alcohol resin or polyvinyl acetal resin.

Aspect 6

The cleaning blade according to any one of Aspects 1 to 5 mentioned above, wherein the elastic cleaning blade substrate has a single layer structure of polyurethane rubber or a laminate structure of polyurethane rubber with different Martens hardness.

Aspect 7

The cleaning blade according to any one of Aspects 1 to 6 mentioned above, wherein the elastic cleaning blade substrate has the single layer structure and the polyurethane rubber has a Martens hardness between 0.5 N/mm$^2$ and 2 N/mm$^2$.

Aspect 8

A cleaning unit includes the cleaning blade of any one of Aspects 1 to 7 mentioned above.

Aspect 9

An intermediate transfer unit includes an intermediate transfer body. And the cleaning blade of any one of Aspects 1 to 7 mentioned above.

Aspect 10

An image forming apparatus includes an image bearer, a charging device to charge the surface of the image bearer, an irradiator to irradiate the surface of the image bearer charged to form a latent electrostatic image, a developing device to develop the latent electrostatic image with toner to form a visible image, a transfer device including an intermediate transfer body to transfer the visible image to a recording medium, a fixing device to fix the image transferred to the recording medium, and a cleaning device comprising the cleaning blade of to any one of Aspects 1 to 7 mentioned above to clean the intermediate transfer body.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A cleaning blade, comprising:

an elastic cleaning blade substrate including an edge layer and a coating layer on a front end of the elastic cleaning blade substrate, wherein the coating layer contacts a cleaning target to clean a surface of the cleaning target, and the front end includes a front ridge; and a cleaning blade support to support the elastic cleaning blade substrate, wherein a maximum penetration depth hmax of an indenter of a microhardness tester is between 4.0 μm and 10.0 μm at a position 100 μm inward from the front ridge on an undersurface of the elastic cleaning blade substrate as measured according to a nanoindentation hardness test.

2. The cleaning blade according to claim 1, wherein the maximum penetration depth hmax is between 5.5 μm and 7.5 μm as measured in accordance with the nanoindentation hardness test.

3. The cleaning blade according to claim 1, wherein the coating layer on the undersurface has a thickness between 0.5 μm and 10 μm at the position 100 μm inward from the front ridge.

4. The cleaning blade according to claim 1, wherein the coating layer comprises particles and a resin binding the particles with the elastic cleaning blade substrate.

5. The cleaning blade according to claim 1, wherein the coating layer comprises an applied film comprising PTFE particles and a fluororesin or acrylic particles and polyvinyl alcohol resin or polyvinyl acetal resin.

6. The cleaning blade according to claim 1, wherein the elastic cleaning blade substrate has a single layer structure of polyurethane rubber or a laminate structure of polyurethane rubber with different Martens hardness.

7. The cleaning blade according to claim 6, wherein the elastic cleaning blade substrate has the single layer structure and the polyurethane rubber has a Martens hardness between 0.5 N/mm$^2$ and 2 N/mm$^2$.

8. A cleaning unit comprising:

the cleaning blade of claim 1.

9. An intermediate transfer unit comprising:

an intermediate transfer body; and the cleaning blade of claim 1.

10. An image forming apparatus, comprising:

an image bearer;

a charging device to charge a surface of the image bearer;

an irradiator to irradiate the surface of the image bearer charged to form a latent electrostatic image;

a developing device to develop the latent electrostatic image with toner to form a visible image;

a transfer device comprising an intermediate transfer body to transfer the visible image to a recording medium;

a fixing device to fix the image transferred to the recording medium; and a cleaning device to clean the intermediate transfer body, wherein the cleaning device includes:

an elastic cleaning blade substrate including an edge layer and a coating layer on a front end of the elastic cleaning blade substrate, wherein the coating layer contacts a cleaning target to clean a surface of the cleaning target, and the front end includes a front ridge; and a cleaning blade support to support the elastic cleaning blade substrate, and a maximum penetration depth hmax of an indenter of a microhardness tester is between 4.0 μm and 10.0 μm at a position 100 μm inward from the front ridge on an undersurface of the elastic cleaning blade substrate as measured according to a nanoindentation hardness test.

11. The cleaning blade according to claim 1, wherein the maximum penetration depth hmax is measured according to the nanoindentation hardness test using a Berkovich indenter.

12. The cleaning blade according to claim 1, wherein the particles serve as domains of a structure of the coating layer, and the domains have a regular spherical shape.

13. The cleaning blade according to claim 1, wherein the maximum penetration depth hmax is measured by pressing the indenter under a load of 1,000 μN.

14. The cleaning blade according to claim 1, wherein an angle formed between a tangent of the cleaning target at a position where the cleaning blade is brought into contact and a front surface of a free end of the elastic cleaning blade substrate is between 65 degrees and 85 degrees.

15. The cleaning blade according to claim 1, wherein a rebound resilience of the elastic cleaning blade substrate is between 10% and 80% at 23 degrees Celsius.

16. The cleaning blade according to claim 1, wherein the elastic cleaning blade substrate comprises a base layer, and an average thickness of the base layer is between 30 μm and 150 μm.

17. The cleaning blade according to claim 4, wherein the resin binding the particles comprises a terpolymer of vinylidene fluoride, hexafluoropropylene, and tetrafluoroethylene.

18. The cleaning blade according to claim 4, wherein a volume average particle diameter of the particles is between 0.1 μm and 1 μm.

19. The cleaning blade according to claim 4, wherein a content of the particles in the coating layer is between 80% by mass and 99% by mass of a total mass of the coating layer.

20. The cleaning blade according to claim 8, wherein the cleaning unit applies a line pressure ranging from 10 N/m to 100 N/m onto a surface of an image bearer.

* * * * *